(12) United States Patent
Nozaki

(10) Patent No.: US 10,173,470 B2
(45) Date of Patent: Jan. 8, 2019

(54) STEEL CORD FOR REINFORCING RUBBER ARTICLE

(71) Applicant: BRIDGESTONE CORPORATION, Tokyo (JP)

(72) Inventor: Yusuke Nozaki, Tokyo (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 27 days.

(21) Appl. No.: 15/329,266

(22) PCT Filed: Jul. 28, 2015

(86) PCT No.: PCT/JP2015/071406
§ 371 (c)(1),
(2) Date: Jan. 26, 2017

(87) PCT Pub. No.: WO2016/017654
PCT Pub. Date: Feb. 4, 2016

(65) Prior Publication Data
US 2017/0210170 A1    Jul. 27, 2017

(30) Foreign Application Priority Data

Jul. 28, 2014  (JP) .................. 2014-153032

(51) Int. Cl.
*B60C 9/00* (2006.01)
*D07B 1/06* (2006.01)
(Continued)

(52) U.S. Cl.
CPC .............. *B60C 9/0007* (2013.01); *B60C 9/00* (2013.01); *D07B 1/06* (2013.01); *D07B 1/062* (2013.01);
(Continued)

(58) Field of Classification Search
CPC B60C 9/00; B60C 9/0007; B60C 9/16; B60C 9/18; B60C 9/20; B60C 2009/0021;
(Continued)

(56) References Cited

U.S. PATENT DOCUMENTS 5,327,713 A * 7/1994 Sakon ................... B60C 9/0007
57/213
5,802,829 A * 9/1998 Yamanaka ............. D07B 1/062
152/527
(Continued)

FOREIGN PATENT DOCUMENTS

CN          1266121 A     9/2000
CN        106232377 A    12/2016
(Continued)

OTHER PUBLICATIONS

International Search Report for PCT/JP2015/071406 dated Oct. 20, 2015 [PCT/ISA/210].
(Continued)

*Primary Examiner* — Ismael Izaguirre
(74) *Attorney, Agent, or Firm* — Sughrue Mion, PLLC

(57) ABSTRACT

Provided is a steel cord for reinforcing a rubber article in which both the rubber penetrability (rust prevention), and the cord strength and shear resistance are highly achieved. Provided is a steel cord for reinforcing a rubber article including: one core strand 11 having a layered-twisted structure formed by twisting a plurality of steel filaments 1; and a plurality of sheath strands 12 having a layered-twisted structure formed by twisting a plurality of steel filaments 2, wherein the sheath strands are twisted around the core strand. An average value Lc of an amount of clearance between outermost layer sheath filaments constituting an outermost layer sheath of the core strand is from 0.073 to 0.130 mm, and the number of the outermost layer sheath filaments is from 7 to 10.

7 Claims, 1 Drawing Sheet

(51) Int. Cl.
*B60C 9/18* (2006.01)
*B60C 9/20* (2006.01)

(52) U.S. Cl.
CPC .............. *D07B 1/0613* (2013.01); *B60C 9/18* (2013.01); *B60C 9/20* (2013.01); *B60C 2009/0092* (2013.01); *D07B 1/0626* (2013.01); *D07B 1/0633* (2013.01); *D07B 2201/2006* (2013.01); *D07B 2201/2029* (2013.01); *D07B 2201/2037* (2013.01); *D07B 2201/2051* (2013.01); *D07B 2201/2061* (2013.01); *D07B 2401/208* (2013.01)

(58) Field of Classification Search
CPC .............. B60C 2009/0092; D07B 1/06; D07B 1/0613; D07B 1/0626; D07B 1/0606; D07B 1/0633; D07B 1/0673; D07B 1/0693; D07B 1/062; D02G 3/22
See application file for complete search history.

(56) References Cited

U.S. PATENT DOCUMENTS

| | | | | |
|---|---|---|---|---|
| 5,806,296 | A | * | 9/1998 | Kaneko ................. D07B 1/062 57/206 |
| 6,189,309 | B1 | | 2/2001 | Han |
| 6,863,103 | B1 | | 3/2005 | Masubuchi et al. |
| 2007/0130905 | A1 | * | 6/2007 | Kish ........................ D02G 3/48 57/237 |
| 2010/0005774 | A1 | * | 1/2010 | Fukuda .................. D07B 1/062 57/212 |
| 2013/0248074 | A1 | * | 9/2013 | Oyama .................. D07B 1/062 152/527 |
| 2015/0368859 | A1 | | 12/2015 | Nishimura et al. |
| 2017/0182846 | A1 | | 6/2017 | Clement et al. |

FOREIGN PATENT DOCUMENTS

| | | |
|---|---|---|
| EP | 0560564 A1 | 9/1993 |
| EP | 2952627 A1 * | 12/2015 |
| FR | 2950904 A | 4/2011 |
| JP | 8-81889 A | 3/1996 |
| JP | 2001-11784 A | 1/2001 |
| JP | 2005-2515 A | 1/2005 |
| JP | 2009-108460 A | 5/2009 |
| WO | 01/34900 A1 | 5/2001 |
| WO | 2014/129300 A1 | 8/2014 |
| WO | 2015/162174 A1 | 10/2015 |

OTHER PUBLICATIONS

Communication dated Jul. 17, 2017, from the European Patent Office in counterpart European Application No. 15827718.6.
Anonymous, "Polygonally Preformed Steel Elements", Mason Publications, vol. 363, No. 29, Jul. 1, 1994; XO007119853 (13 pages).

\* cited by examiner

STEEL CORD FOR REINFORCING RUBBER ARTICLE

CROSS REFERENCE TO RELATED APPLICATIONS

This application is a National Stage of International Application No. PCT/JP2015/071406, filed on Jul. 28, 2015, which claims priority from Japanese Patent Application No. 2014-153032, filed on Jul. 28, 2014, the contents of all of which are incorporated herein by reference in their entirety.

TECHNICAL FIELD

The present invention relates to a steel cord for reinforcing a rubber article (hereinafter, also simply referred to as "cord"), and particularly to a steel cord for reinforcing a rubber article for use in reinforcing applications for rubber articles such as tires.

BACKGROUND ART

For a rubber article such as a tire, a steel cord formed by twisting a plurality of steel filaments is widely used as a reinforcing material. In particular, since a tire used for a heavy duty vehicle such as a construction vehicle is used under heavy loading on rough terrain having sharp rises or drops or the like, a steel cord to be used as a reinforcing material is demanded to have a particularly high strength and resistance. For this reason, in such a large tire, a steel cord having a so-called multi-twisted structure, which is formed by twisting a plurality of strands formed by twisting a plurality of steel filaments, is employed.

As a prior art relating to a steel cord having a multi-twisted structure, for example, Patent Document 1 discloses a steel cord constituted in such a manner that, in order to surely allow rubber penetrate to the inside of the cord having a multi-twisted structure, around one core strand composed of a plurality of filaments, five sheath strands having the same diameter as that of the core strand, each composed of a plurality of filaments, are twisted.

RELATED ART DOCUMENT

Patent Document

Patent Document 1: Japanese Unexamined Patent Application Publication No. 2001-11784 (Claims and the like)

SUMMARY OF THE INVENTION

Problems to be Solved by the Invention

In a steel cord used for reinforcing a tire, from the viewpoint of preventing the occurrence of rust, preferably, rubber sufficiently fills a space between filaments constituting the cord, and so-called rubber penetrability (rubber permeability) is favorable. However, in a cord having a multi-twisted structure, since the number of filaments is large and the twisted structure is complicated, in order to achieve sufficient rubber penetrability to obtain a desired rust prevention property, the strength and the shear resistance of the cord have had to be sacrificed.

Accordingly, an object of the present invention is to provide a steel cord for reinforcing a rubber article in which, in a cord having a multi-twisted structure, both the rubber penetrability (rust prevention), and the cord strength and shear resistance are highly achieved by appropriately balancing the cord structure and the amount of clearance between filaments constituting the cord.

Means for Solving the Problems

The present inventor intensively studied to find that the above-described problems can be solved by employing the following configuration, thereby completing the present invention.

That is, the steel cord for reinforcing a rubber article of the present invention is a steel cord for reinforcing a rubber article comprising: one core strand having a layered-twisted structure formed by twisting a plurality of steel filaments; and a plurality of sheath strands having a layered-twisted structure formed by twisting a plurality of steel filaments, wherein the sheath strands are twisted around the core strand, and
wherein an average value Lc of an amount of clearance between outermost layer sheath filaments constituting an outermost layer sheath of the core strand is from 0.073 to 0.130 mm, and the number of the outermost layer sheath filaments is from 7 to 10.

In the cord of the present invention, preferably, the number of the sheath strands is from 7 to 9. In the cord of the present invention, preferably, all filaments constituting the core strand have the same diameter. Further, in the cord of the present invention, preferably, a cord diameter is not less than 5.00 mm.

Still further, in the cord of the present invention, preferably, the ratio Lc/Ls of the average value Lc of the amount of clearance between the outermost layer sheath filaments constituting the outermost layer sheath of the core strand to an average value Ls of an amount of clearance between outermost layer sheath filaments constituting an outermost layer sheath of the sheath strand is more than 1 and not more than 1.5. Still further, in the cord of the present invention, preferably, the core strand has a two-layered structure.

A pneumatic tire of the present invention is characterized in that the steel cord for reinforcing a rubber article of the present invention is used as a reinforcing material.

Effects of the Invention

According to the present invention, it becomes possible to realize a steel cord for reinforcing a rubber article in which both the rubber penetrability (rust prevention), and the cord strength and shear resistance are highly achieved.

MODE FOR CARRYING OUT THE INVENTION

Figure 1:
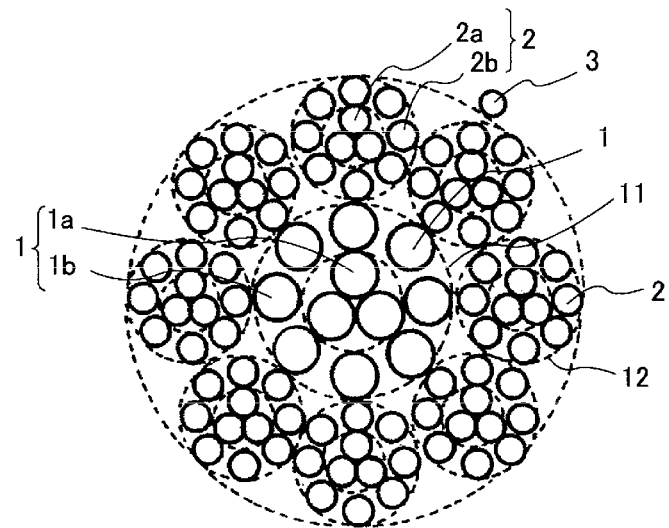
FIG. 1 is a cross-sectional view in the width direction illustrating one configuration example of a steel cord for reinforcing a rubber article of the present invention.
Figure 2:
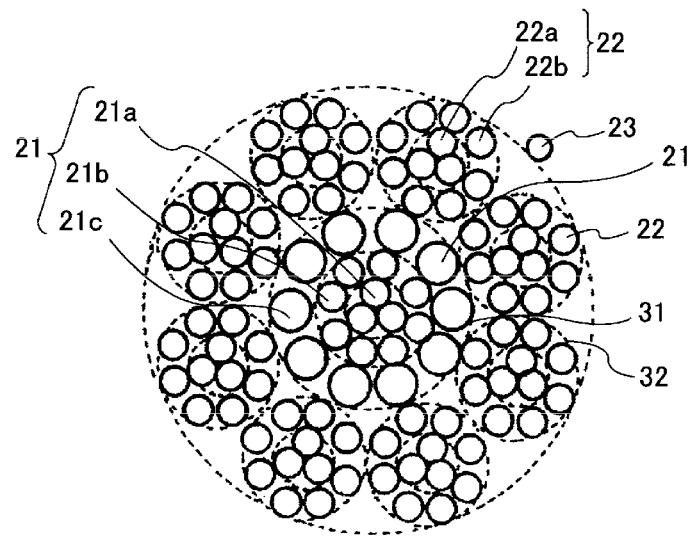
FIG. 2 is a cross-sectional view in the width direction illustrating another configuration example of a steel cord for reinforcing a rubber article of the present invention.

Hereinafter, embodiments of the present invention will be described in detail with reference to the drawing.
FIG. 1 and FIG. 2 are a cross-sectional view in the width direction illustrating one configuration example of a steel cord for reinforcing a rubber article of the present invention. The cord illustrated in FIG. 1 comprises: one core strand 11 having a two-layered layered-twisted structure formed by twisting a plurality of steel filaments 1; and a plurality of (in the illustrated example, eight) sheath strands 12 each having two-layered layered-twisted structure formed by twisting a plurality of steel filaments 2, and has a multi-twisted structure formed by twisting the sheath strands 12 around the core strand 11. In the illustrated cord, the core strand 11 has a 3+8 structure in which a sheath is formed by twisting eight sheath filaments 1b around a core composed of twisted three core filaments 1a, and the sheath strand 12 has a 3+8 structure in which a sheath is formed by twisting eight sheath filaments 2b around a core composed of twisted three core filaments 2a. In the illustrated cord, a spiral filament 3 is spirally wound around the outer periphery of the sheath strand 12.

The cord illustrated in FIG. 2 comprises: one core strand 31 having a three-layered layered-twisted structure formed by twisting a plurality of steel filaments 21; and a plurality of (in the illustrated example, eight) sheath strands 32 each having two-layered layered-twisted structure formed by twisting a plurality of steel filaments 22, and has a multi-twisted structure formed by twisting the sheath strands 32 around the core strand 31. In the illustrated cord, the core strand 31 has a 3+8+10 structure in which a first sheath is formed by twisting eight sheath filaments 21b around a core composed of twisted three core filaments 21a, and a second sheath is formed by twisting ten second sheath filaments 21c therearound, and the sheath strand 32 has a 3+8 structure in which a sheath is formed by twisting eight sheath filaments 22b around a core composed of twisted three core filaments 22a. In the illustrated cord, a spiral filament 23 is spirally wound around the outer periphery of the sheath strand 32.

In the present invention, it is important that the average value Lc of the amount of clearance between the outermost layer sheath filaments 1b, 21c constituting the outermost layer sheath of the core strands 11, 31 is from 0.073 to 0.130 mm, and that the number of the outermost layer sheath filaments 1b, 21c is from 7 to 10. As described above, in order to improve the rubber penetrability, it is effective to increase the amount of clearance between the filaments, and in particular, with respect to the core strand located at the center of the cord, the larger the amount of one clearance with respect to the total amount of the amount of clearance between the outermost layer filaments is, the more favorable rubber penetrability can be obtained. On the other hand, when the number of the outermost layer filaments of the core strand is set to not more than six in order to provide a clearance, the strength of the cord decreases, and when the diameter of the outermost layer filaments of the core strand is reduced and the number of the outermost layer filaments is increased to not less than 11, the shear resistance against the sheath strand decreases. Therefore, in the present invention, by setting the average value Lc of the amount of clearance between the outermost layer sheath filaments of the core strand within the above-described range, and setting the number of the outermost layer sheath filaments to from 7 to 10, a cord in which, while ensuring the cord strength and the shear resistance, the rubber permeability is improved, thereby improving rust prevention is realized.

Here, in the present invention, the average value Lc of the amount of clearance between the outermost layer sheath filaments of the core strand is a calculated value obtained by dividing the value obtained by subtracting the sum of the diameters of the outermost layer filaments constituting the strand from the perimeter of the virtual circle or the ellipse passing through the center points of all the outermost layer filaments constituting the strand, by the number of the outermost layer filaments constituting the strand. The average value Lc of the amount of clearance between the outermost layer sheath filaments needs to be from 0.073 to 0.130 mm, and is preferably from 0.100 to 0.110 mm. When the average value Lc of the amount of clearance between the outermost layer sheath filaments is less than 0.073 mm, sufficient rust prevention is not obtained, and when the average value exceeds 0.130 mm, sufficient cord strength and shear resistance are not obtained.

In the present invention. The ratio Lc/Ls of the average value Lc of the amount of clearance between the outermost layer sheath filaments constituting the outermost layer sheath of the core strand to the average value Ls of the clearance amount between the outermost layer sheath filaments constituting the outermost layer sheath of the sheath strand is preferably more than 1 and not more than 1.5, and more preferably from 1.25 to 1.42. Rubber is less likely to penetrate the core strand located at the center of the cord than the sheath strand located therearound, and therefore, from the viewpoint of further improving the rust prevention, it is preferable that the average value of the amount of clearance between the outermost layer sheath filaments is larger in the core strand than the sheath strand. Here, the average value Ls of the amount of clearance between the outermost layer sheath filaments of the sheath strand is a value obtained in a similar manner to the average value Lc of the amount of clearance between the outermost layer sheath filaments of the core strand.

In the cord of the present invention, the number of layers of the layered-twisted structure of the core strand is not particularly limited, and may be, for example, from 2 to 3. In this case, assuming that a first sheath and a second sheath are sequentially formed from the inner layer of the layered-twisted structure, when the core strand 11 has a two-layered layered-twisted structure as illustrated in FIG. 1, the outermost layer sheath of the core strand 11 is the first sheath, and when the core strand 31 has a three-layered layered-twisted structure as illustrated in FIG. 2, the outermost layer sheath of the core strand 31 is the second sheath. The number of layers of the layered-twisted structure of the sheath strand is not particularly limited, and may be, for example, from 2 to 3. In this case, similarly to the case of the core strand, when the sheath strand 12, 32 has two-layered layered-twisted structure as illustrated in FIG. 1 and FIG. 2, the outermost layer sheath of the sheath strand 12, 32 is the first sheath.

In the cord of the present invention, the number of the sheath strand 12 is preferably from 7 to 9. When all the core strand and sheath strands have the same diameter and the sheath strands are close-packed without a gap therebetween, six sheath strands can be arranged. However, as illustrated in the drawing, in the present invention, since the diameter of the sheath strand 12 is smaller than that of the core strand 11, seven to nine sheath strands 12 can be arranged. Accordingly, by setting the number of the sheath strands 12 to from 7 to 9, it is possible to further improve the resistance of the core strand to the tightening force of the sheath strand, and to further improve the cut resistance of the cord.

In the cord of the present invention, as illustrated in FIG. 1, when the core strand has a two-layered structure, it is preferable that all the filaments 1 constituting the core strand 11 have the same diameter. It is possible to improve the shear resistance by making the core filament 1a smaller in diameter than the sheath filament 1b in the core strand 11. In this case, however, it is difficult to ensure sufficient amount of clearance between the sheath filaments. Accordingly, when the core strand has a two-layered structure, it is preferable that all the filaments 1 constituting the core strand 11 have the same diameter. Similarly, as illustrated in FIG. 2, when the core strand has a three-layered structure, it is preferable that, among filaments constituting the core strand 31, all of core filaments 21a and first sheath filaments 21b have the same diameter. When the core filament 21a is made smaller in diameter than the first sheath filament 21b in the core strand 31, it is difficult to ensure sufficient amount of clearance between first sheath filaments. Accordingly, when the core strand has a three-layered structure, it is preferable that all the core filaments 21a and first sheath filaments 21b have the same diameter.

Further, the cord diameter of the cord of the present invention is preferably 5.00 mm or more, for example, from 5.00 to 6.00 mm. By using a cord having a diameter of 5.00 mm or more, it is possible to secure both strength and cut resistance required, particularly for large tires used for heavy duty vehicles such as construction vehicles.

In the cord of the present invention, the wire diameter and tensile strength of the filament to be used, the twisting direction, the twisting pitch, and the like of the filament or strand are not particularly limited, and can be appropriately selected according to the ordinary method as desired. For example, as the filament, a so-called high tensile strength steel having a carbon content of 0.80% by mass or more can be used. The cord of the present invention may or may not include a spiral filament.

Since the cord of the present invention is excellent in the rubber permeability, shear resistance, and strength, it is particularly suitable for a reinforcing material of large tires used for heavy duty vehicles such as construction vehicles, among others, ultra-large off-road radial tires having a tire size of about 40.00 R57. Such a large tire usually comprises: one or more carcasses composed of plies of steel cords extending in the radial direction between a pair of bead cores; at least four belt-crossing layers arranged radially outside the crown portion of the crown portion; and a tread disposed outside in the tire radial direction. The cord of the present invention can be used, for example, as a reinforcing cord for a belt crossing layer in such a tire.

Examples

Hereinafter, the present invention will be described in more detail by way of examples.

As shown in the following Tables, average values Lc and Ls of the amount of clearances between outermost layer sheath filaments constituting the outermost layer sheaths of a core strand and sheath strands were changed by changing the cord structure, to prepare steel cords for reinforcing a rubber article of Examples and Comparative Examples in which a plurality of sheath strands having a layered-twisted structure were twisted around one core strand having a layered-twisted structure. The results of the following evaluations for the obtained cords are also shown in the following Tables.

(Shear Resistance)

For each obtained cord, the shear resistance was evaluated using a Charpy impact tester. The larger the numerical value is, the better the shear resistance is, which is favorable. A value was obtained by dividing the obtained shear resistance by the cross-sectional area of the cord, and the obtained value was indexed with Comparative Example 1 taken as 100. The larger the number is, the more favorable the cord is.

(Rubber Penetration Rate)

The ratio of the rubber coated area to the surface area was measured for each cord (1) inside the outermost layer sheath filament of the core strand, (2) on the surface of the core strand, and (3) inside the outermost layer sheath filament of the sheath strand, and expressed as percentage (%). The larger the numerical value is, the better the rubber permeability is, which is favorable. In the results, indices with Comparative Example 1 taken as 100 were compared with each other. A larger number indicates that it is more favorable.

(Rust Progression Rate)

The rust progression rate was measured for each cord (1) inside the outermost layer sheath filament of the core strand, (2) on the surface of the core strand, and (3) inside the outermost layer sheath filament of the sheath strand, and expressed as percentage (%). The smaller the numerical value is, the smaller the rust progression is, which is favorable. In the results, indices with Comparative Example 1 taken as 100 were compared with each other. A smaller number indicates that it is more favorable.

TABLE 1

|  |  | Comparative Example 1 | Comparative Example 2 | Comparative Example 3 | Comparative Example 4 | Example 1 | Example 2 |
|---|---|---|---|---|---|---|---|
|  | Cord structure | (3 + 8 × 0.34) + 6 × (3 + 8 × 0.34) + 0.25 | (3 + 6 × 0.465) + 6 × (3 + 8 × 0.425) + 0.25 | (2 + 7 × 0.445) + 6 × (2 + 7 × 0.445) + 0.25 | (3 × 0.54 + 11 × 0.45) + 7 × (3 + 8 × 0.38) + 0.25 | (3 + 8 × 0.52) + 7 × (3 + 8 × 0.395) + 0.25 | (3 + 8 × 0.53) + 7 × (3 + 8 × 0.39) + 0.25 |
| Core strand | Number of outermost layer filaments | 8 | 6 | 7 | 11 | 8 | 8 |
|  | Average amount of clearance Lc (mm) between outermost layer filaments | 0.07 | 0.268 | 0.134 | 0.005 | 0.108 | 0.11 |
|  | Total amount of clearance (mm) between outermost layer filaments | 0.56 | 1.608 | 0.938 | 0.055 | 0.864 | 0.88 |
| Sheath strand | Number of outermost layer filaments | 8 | 8 | 7 | 8 | 8 | 8 |
|  | Average amount of clearance Ls (mm) between outermost layer filaments | 0.07 | 0.088 | 0.134 | 0.079 | 0.082 | 0.081 |
|  | Total amount of clearance (mm) between outermost layer filaments | 0.56 | 0.705 | 0.938 | 0.630 | 0.656 | 0.648 |
|  | Lc/Ls | 1.00 | 3.04 | 1.00 | 0.063 | 1.32 | 1.36 |
|  | Cord diameter (mm) | 4.24 | 5.46 | 5.34 | 5.22 | 5.44 | 5.44 |
| Shear resistance/cord cross-sectional area (index)* |  | 100 | 97 | 82 | 118 | 122 | 120 |
| Rubber penetration rate (index)* |  | 100 | 112 | 147 | 60 | 110 | 111 |
| Rust progression rate (index)* |  | 100 | 80 | 25 | 164 | 83 | 82 |

*Values of "Shear resistance/cord cross-sectional area", "rubber penetration rate" and "rust progression rate" are all indexed with Comparative Example 1 taken as 100. The higher the numerical values of "Shear resistance/cord cross-sectional area" and "rubber penetration rate" are the more favorable. The lower the numerical value of "rust progression rate" is, the more favorable.

TABLE 2

|  |  | Example 3 | Example 4 | Example 5 | Example 6 |
|---|---|---|---|---|---|
|  | Cord structure | (3 + 8 × 0.54) + 7 × (3 + 8 × 0.385) + 0.25 | (3 + 8 × 0.51) + 7 × (3 × 0.380 + 8 × 0.400) + 0.25 | (3 + 8 × 0.54) + 8 × (3 × 0.300 + 7 × 0.365) + 0.25 | (3 + 8 × 0.56) + 9 × (1 × 0.50 + 6 × 0.35) + 0.25 |
| Core strand | Number of outermost layer filaments | 8 | 8 | 8 | 8 |
|  | Average amount of clearance Lc (mm) between outermost layer filaments | 0.112 | 0.106 | 0.112 | 0.116 |
|  | Total amount of clearance (mm) between outermost layer filaments | 0.896 | 0.848 | 0.896 | 0.928 |
| Sheath strand | Number of outermost layer filaments | 8 | 8 | 7 | 6 |
|  | Average amount of clearance Ls (mm) between outermost layer filaments | 0.08 | 0.066 | 0.074 | 0.075 |
|  | Total amount of clearance (mm) between outermost layer filaments | 0.64 | 0.531 | 0.517 | 0.45 |
|  | Lc/Ls | 1.40 | 1.61 | 1.51 | 1.55 |
|  | Cord diameter (mm) | 5.44 | 5.36 | 5.00 | 4.73 |
|  | Shear resistance/cord cross-sectional area (index)* | 117 | 108 | 112 | 110 |
|  | Rubber penetration rate (index)* | 112 | 102 | 113 | 113 |
|  | Rust progression rate (index)* | 80 | 97 | 79 | 79 |

As can be seen from the results in the above Tables, in each of the cords of the Examples in which a plurality of sheath strands having a layered-twisted structure were twisted around one core strand having a layered-twisted structure, and the average value Lc of the amount of clearance between outermost layer sheath filaments of the core strand and the number of outermost layer sheath filaments satisfied predetermined conditions, it is obvious that both the rubber penetrability (rust prevention), and the cord strength and shear resistance are highly achieved.

DESCRIPTION OF SYMBOLS 1, 2, 21, 22 Steel filament
1a, 2a, 21a, 22a Core filament
1b Sheath filament (outermost layer sheath filament)
2b, 22b Sheath filament
3, 23 Spiral filament
11, 31 Core strand
12, 32 Sheath strand
21b First sheath filament
21c Second sheath filament (outermost layer sheath filament)

The invention claimed is:

1. A steel cord for reinforcing a rubber article comprising: one core strand having a layered-twisted structure formed by twisting a plurality of steel filaments; and a plurality of sheath strands having a layered-twisted structure formed by twisting a plurality of steel filaments, wherein the sheath strands are twisted around the core strand, and wherein an average value Lc of an amount of clearance between outermost layer sheath filaments constituting an outermost layer sheath of the core strand is from 0.073 to 0.130 mm, and the number of the outermost layer sheath filaments is from 7 to 10.

2. The steel cord for reinforcing a rubber article according to claim 1, wherein the number of the sheath strands is from 7 to 9.

3. The steel cord for reinforcing a rubber article according to claim 1, wherein all filaments constituting the core strand have the same diameter.

4. The steel cord for reinforcing a rubber article according to claim 1, wherein a cord diameter is not less than 5.00 mm.

5. The steel cord for reinforcing a rubber article according to claim 1, wherein the ratio Lc/Ls of the average value Lc of the amount of clearance between the outermost layer sheath filaments constituting the outermost layer sheath of the core strand to an average value Ls of an amount of clearance between outermost layer sheath filaments constituting an outermost layer sheath of the sheath strand is more than 1 and not more than 1.5.

6. The steel cord for reinforcing a rubber article according to claim 1, wherein the core strand has a two-layered structure.

7. A pneumatic tire, wherein the steel cord for reinforcing a rubber article according to claim 1 is used as a reinforcing material.

* * * * *